United States Patent
Nishio et al.

(10) Patent No.: US 6,345,388 B1
(45) Date of Patent: *Feb. 5, 2002

(54) METHOD AND APPARATUS FOR TRANSMITTING AND RECEIVING TELEVISION SIGNAL

(75) Inventors: Toshiro Nishio, Hirakata; Kiyoshi Imai, Kyoto; Akira Usui, Takatsuki, all of (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,746

(22) Filed: Jan. 24, 1997

(30) Foreign Application Priority Data

Jan. 26, 1996 (JP) ............................... 8-011561

(51) Int. Cl.⁷ .............................. H04N 7/14; H04N 7/10
(52) U.S. Cl. .......................... 725/93; 725/116; 725/122
(58) Field of Search .................. 348/7, 10, 11, 348/12, 13, 14, 15, 16, 17, 19, 469, 403; 725/90, 91, 92, 95, 96, 98, 100, 101, 103, 106, 110, 118, 120, 121, 122, 2, 87, 116, 146, 93, 105

(56) References Cited

U.S. PATENT DOCUMENTS

| | | | |
|---|---|---|---|
| 5,235,420 A | 8/1993 | Gharavi | 358/136 |
| 5,253,058 A | 10/1993 | Gharavi | 358/136 |
| 5,355,162 A * | 10/1994 | Yazokino et al. | 348/11 |
| 5,442,398 A | 8/1995 | Koshiro et al. | 348/385 |
| 5,748,903 A * | 5/1998 | Agarwal | 348/403 |

FOREIGN PATENT DOCUMENTS

| | | |
|---|---|---|
| EP | 0 448 491 A1 | 9/1991 |
| EP | 0 751 685 A1 | 1/1997 |
| JP | 64-7555 | 2/1989 |
| JP | 1-258851 | 10/1989 |
| JP | 1-317079 | 12/1989 |
| JP | 3-52278 | 8/1991 |
| JP | 3-237894 | 10/1991 |
| JP | 4-240982 | 8/1992 |
| JP | 7-79420 | 3/1995 |
| JP | 7-123375 | 5/1995 |

* cited by examiner

*Primary Examiner*—Michael Lee
(74) *Attorney, Agent, or Firm*—Parkhurst & Wendel, L.L.

(57) ABSTRACT

In a television signal transmitting and receiving apparatus, a digitally coded television signal, such as an MPEG2-Video stream, is transmitted, and an accounting level requested by the use is input to the receiver, whereby the decoding coefficient at decoding in an MPEG2-Video decoder is varied to obtain n image having a resolution according to the accounting level. In this apparatus, it is possible to offer a service with a resolution according to the accounting level.

30 Claims, 4 Drawing Sheets

Fig.2

Fig.3 (a) double-speed signal (525P)

Fig.3 (b) interlace signal 1 (525I)

Fig.3 (c) interlace signal 2 (525I)

Fig.4

METHOD AND APPARATUS FOR TRANSMITTING AND RECEIVING TELEVISION SIGNAL

FIELD OF THE INVENTION

The present invention relates to a method and an apparatus for transmitting and receiving television signals and, more particularly, to those capable of selecting the grade of received image quality according to the accounting system in chargeable broadcasting employing digital signals.

BACKGROUND OF THE INVENTION

In the present television broadcasting, most television images are broadcasted by analog signals. In satellite broadcasting employing the present NTSC (National Television System Committee) system, a transmission speed of 100 Mbps is required, and only one channel can be broadcasted using a transmission band of 27 MHz. On the other hand, a high resolution television, such as a high-grade television, requires a transmission speed of 1.2 Gbps, that is, more than ten times as high as the transmission speed of the NTSC system.

Accordingly, digital television broadcasting has attracted attention in recent years. For example, when the present NTSC system is compressed to 1/25 using information compressing techniques, required transmission speed is only 4 Mbps, and broadcasts for six channels are possible per the present one channel. In a high-grade television, broadcasting is possible at a transmission speed of about 30 Mbps. In this way, the digital television broadcasting has various advantages over the analog television broadcasting, for example, effective use of electric wave resource, and transmission of high-quality image with less defect.

On the other hand, chargeable television broadcasting, such as BS, CS, or CATV, has spread in recent years. In the chargeable broadcasting, it is considered to vary the accounting level according to the content of program or the like.

SUMMARY OF THE INVENTION

An object of the present invention is to provide a method and an apparatus for transmitting and receiving television signals, which can provide a service at a resolution or a tone quality according to an accounting system, in digital television broadcasting.

Other objects and advantages of the invention will become apparent from the detailed description that follows.

The detailed description and specific embodiments described are provided only for illustration since various additions and modifications within the scope of the invention will be apparent to those of skill in the art from the detailed description.

According to a first aspect of the present invention, a television signal transmitting method for transmitting a digitally coded television signal includes the step of transmitting, as the digitally coded television signal, one of a video signal having a resolution and an audio signal having a tone quality, which resolution and tone quality correspond to a decoding coefficient that is input to a receiver by a user.

According to a second aspect of the present invention, a television signal transmitting apparatus for transmitting a digitally coded television signal comprises an encoding means for transmitting, as the digitally coded television signal, one of a video signal having a resolution and an audio signal having a tone quality, which resolution and tone quality correspond to a decoding coefficient that is input to a receiver by a user.

According to a third aspect of the present invention, a television signal receiving method for receiving a digitally coded television signal, comprises the steps of variably controlling a decoding coefficient value in response to an external input; and converting the digitally coded television signal into one of a video signal having a resolution according to the controlled decoding coefficient and an audio signal having a quality according to the controlled decoding coefficient.

According to a fourth aspect of the present invention, the above-mentioned television signal receiving method comprises the steps of storing the variation in the decoding coefficient value, as information, with the lapse of time; and posting the information, for a prescribed period of time, to a base station that sends the television signal.

According to a fifth aspect of the present invention, a television signal receiving apparatus for receiving a digitally coded television signal, comprises a decoding coefficient control means for variably controlling a decoding coefficient value in response to a user input; and a signal reproducing means for converting the digitally coded television signal into one of a video signal having a resolution according to the controlled decoding coefficient and an audio signal having a quality according to the controlled decoding coefficient.

According to a sixth aspect of the present invention, the above-mentioned television signal receiving apparatus comprises means for storing the variation in the decoding coefficient value, as information, with the lapse of time, and posting the information, for a prescribed period of time, to a base station that sends the television signal.

According to a seventh aspect of the present invention, a television signal transmitting method for transmitting a digitally coded television signal, comprises the steps of separating a video signal into N video signals (N=integer); and coding the N video signals individually and transmitting the coded video signals through different channels.

According to an eighth aspect of the present invention, in a television signal receiving method for receiving a digitally coded television signal, it is possible to select one of a case where all of coded N video signals (N=integer) are reproduced and a case where some of the N video signals are reproduced, in accordance with an external input.

According to a ninth aspect of the present invention, a television signal transmitting apparatus for transmitting a digitally coded television signal, comprises a video signal separating means for separating a video signal into N video signals (N=integer); and a video signal encoding means for coding the N video signals individually and transmitting the coded video signals through different channels.

According to a tenth aspect of the present invention, a television signal receiving apparatus for receiving a digitally coded television signal, comprises a video signal decoding means capable of selecting one of a case where all of coded N video signals (N=integer) are reproduced and a case where some of the N video signals are reproduced, in accordance with an external input.

According to an eleventh aspect of the present invention, a television signal transmitting method for transmitting a digitally coded television signal, comprises the steps of separating a video signal having a resolution twice as high as an ordinary resolution into two video signals each having the ordinary resolution; and coding the two video signals individually, and transmitting the coded video signals through different channels.

According to a twelfth aspect of the present invention, in a television signal receiving method for receiving a digitally coded television signal, it is possible to select one of a case where both of two coded video signals, each having an ordinary resolution, are reproduced and a case where one of the coded video signals is reproduced, in accordance with an external input.

According to a thirteenth aspect of the present invention, a television signal transmitting apparatus for transmitting a digitally coded television signal, comprises a video signal separating means for separating a video signal having a resolution twice as high as an ordinary resolution into two video signals each having the ordinary resolution; and a video signal encoding means for coding the two video signals individually, and transmitting the coded video signals through different channels.

According to a fourteenth aspect of the present invention, a television signal receiving apparatus for receiving a digitally coded television signal, comprises a video signal decoding means capable of selecting one of a case where both of two coded video signals, each having an ordinary resolution, are reproduced and a case where one of the coded video signals is reproduced, in accordance with an external input.

According to a fifteenth aspect of the present invention, a television signal transmitting method for transmitting a digitally coded television signal, comprises the steps of separating a video signal having a resolution twice as high as an ordinary resolution into a first video signal comprising high-frequency components and a second video signal comprising components other than the high-frequency components; and coding the first video signal and the second video signal individually, and transmitting the coded first and second video signals through different channels.

According to a sixteenth aspect of the present invention, in a television signal receiving method for receiving a digitally coded television signal, it is possible to select one of a case where both of a first video signal comprising high-frequency components and a second video signal comprising components other than the high-frequency components, which video signals are obtained by separating a video signal having a resolution twice as high as an ordinary resolution, and a case where one of the first and second video signals is reproduced, in accordance with an external input.

According to a seventeenth aspect of the present invention, a television signal transmitting apparatus for transmitting a digitally coded television signal, comprises a video signal separating means for separating a video signal having a resolution twice as high as an ordinary resolution into a first video signal comprising high-frequency components and a second video signal comprising components other than the high-frequency components; and a video signal encoding means for encoding the first video signal and the second video signal individually, and transmitting the coded first and second video signals through different channels.

According to an eighteenth aspect of the present invention, a television signal receiving apparatus for receiving a digitally coded television signal, comprises a video signal decoding means capable of selecting one of a case where both of a first video signal comprising high-frequency components and a second video signal comprising components other than the high-frequency components, which video signals are obtained by separating a video signal having a resolution twice as high as an ordinary resolution, and a case where one of the first and second video signals is reproduced, in accordance with an external input.

DETAILED DESCRIPTION OF THE PREFERRED EMBODIMENTS

[Embodiment 1]

Figure 1:
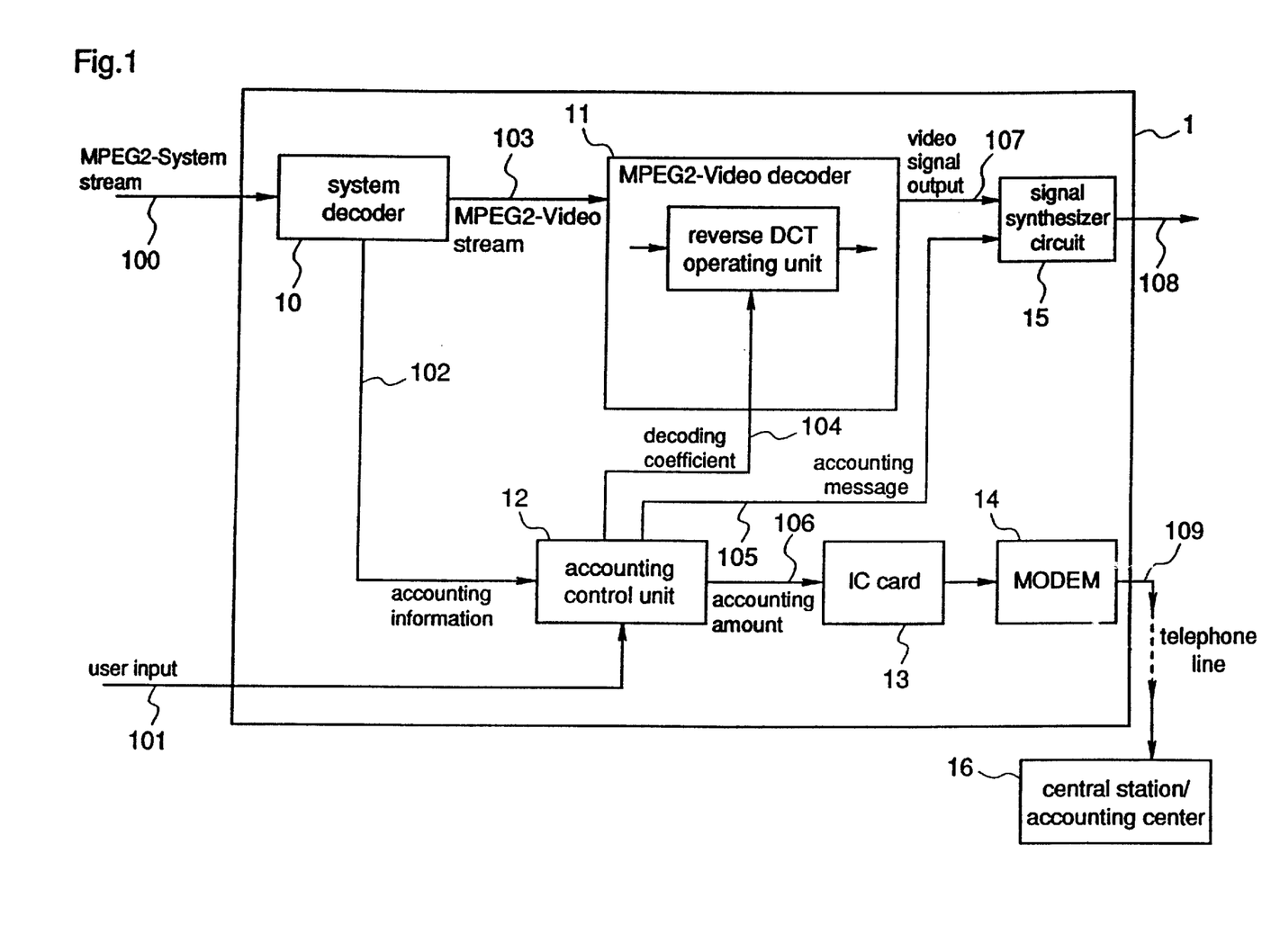
FIG. 1 is a block diagram illustrating a television signal transmitting and receiving apparatus according to a first embodiment of the present invention.

FIG. 1 is a block diagram illustrating a structure of a receiver (decoder) in a television signal transmitting and receiving apparatus according to a first embodiment of the present invention. In this first embodiment, when a stream specified in MPEG2-System is decoded, the decoding coefficient is varied according to the accounting level, whereby the resolution of the decoded image is varied. In FIG. 1, reference numeral 1 designates a video decoder to which a stream 100 specified in MPEG2-System (hereinafter referred to as an MPEG2-System stream) is input. Reference numeral 10 designates a system decoder for analyzing the MPEG2-System stream 100 and extracting accounting information 102 and a stream 103 specified in MPEG2-Video (hereinafter referred to as MPEG2-Video stream) from the MPEG2-System stream 100. Reference numeral 11 designates an MPEG2-Video decoder including a reverse DCT (Discrete Cosine Transform) operation unit. Reference numeral 12 designates an accounting control unit for controlling the accounting level according to an input 101 from the user. Reference numeral 13 designates an IC card for totalizing the accounting amounts. Reference numeral 14 designates a MODEM (modulator-demodulator) for transmitting accounting amount information 109 output from the IC card 13 through a telephone line to a central station/accounting center 16. Reference numeral 15 designates a signal synthesizer circuit for synthesizing a decoded video signal output from the video decoder 11 and an accounting message 105 output from the accounting control unit 12, and outputting a monitor output 108.

A description is given of the operation of the television signal transmitting and receiving apparatus according to the first embodiment. As shown in FIG. 1, in the system decoder 10 to which the MPEG2-System stream 100 is input, the accounting information 102 and the MPEG2-Video stream 103, which are described in the stream 100, are extracted. The MPEG2-System has wide application, including application of MPEG1 system that can multiplexes a plurality of video or audio streams coded individually to produce a single stream (data sequence) as a set of programs, and it is also able to unify a plurality of programs to make a single stream. Therefore, the MPEG2-System is a suitable standard for television broadcasting.

The accounting information 102 extracted in the system decoder 10 is input to the accounting control unit 12. The accounting control unit 12 confirms the accounting level requested by the user (user input 101) and outputs a decoding coefficient control signal 104 according to the accounting level to the reverse DCT operation unit in the MPEG2-Video decoder 11. Receiving the decoding coefficient control signal 104, the MPEG2-Video decoder 11 performs decoding (orthogonal transform) of the stream 103 at a level corresponding to the decoding coefficient control signal 104, and outputs a video signal 107. To be specific, the stream 103 is fully decoded when the accounting level is high whereas only a low-frequency component of the stream 103 is decoded when the accounting level is low.

The accounting control unit 12 always monitors the accounting condition according to the selected accounting level from the accounting information 102 and the user input 101, and outputs the accounting condition, as an accounting message 105, toward the video signal synthesizer 15. The video signal synthesizer 15 synthesizes the video signal 107 and the accounting message 105 as occasion demands, and outputs a monitor signal 108. The IC card 13 always receives accounting amount signals 106 output from the accounting control unit 12, totalizes the accounting amount signals, and sends accounting amount information 109, which is obtained by totalizing the accounting amount signals for a prescribed period of time, through the MODEM 14 to the central station/accounting center 16. The transmission of the accounting amount information 109 would be automatically carried out during a period of time when the telephone line is not crowded, for example, from midnight to early morning.

As described above, according to the first embodiment of the invention, a digitally coded television signal, such as the MPEG2-Video stream 103, is transmitted, and an accounting level requested by the user is input to the receiver as the user input 101, whereby the decoding coefficient (DCT coefficient) at the decoding in the MPEG2-Video decoder 11 is varied to obtain an image having a resolution according to the accounting level. Therefore, an apparatus and a method for transmitting and receiving television signals that can offer a service with a resolution according to the accounting level are realized. In addition, since decoding of the stream 103 is performed by an operation according to the decoding coefficient which can be set ungradedly, it is possible to set the accounting level ungradedly.

[Embodiment 2]

Figure 2:
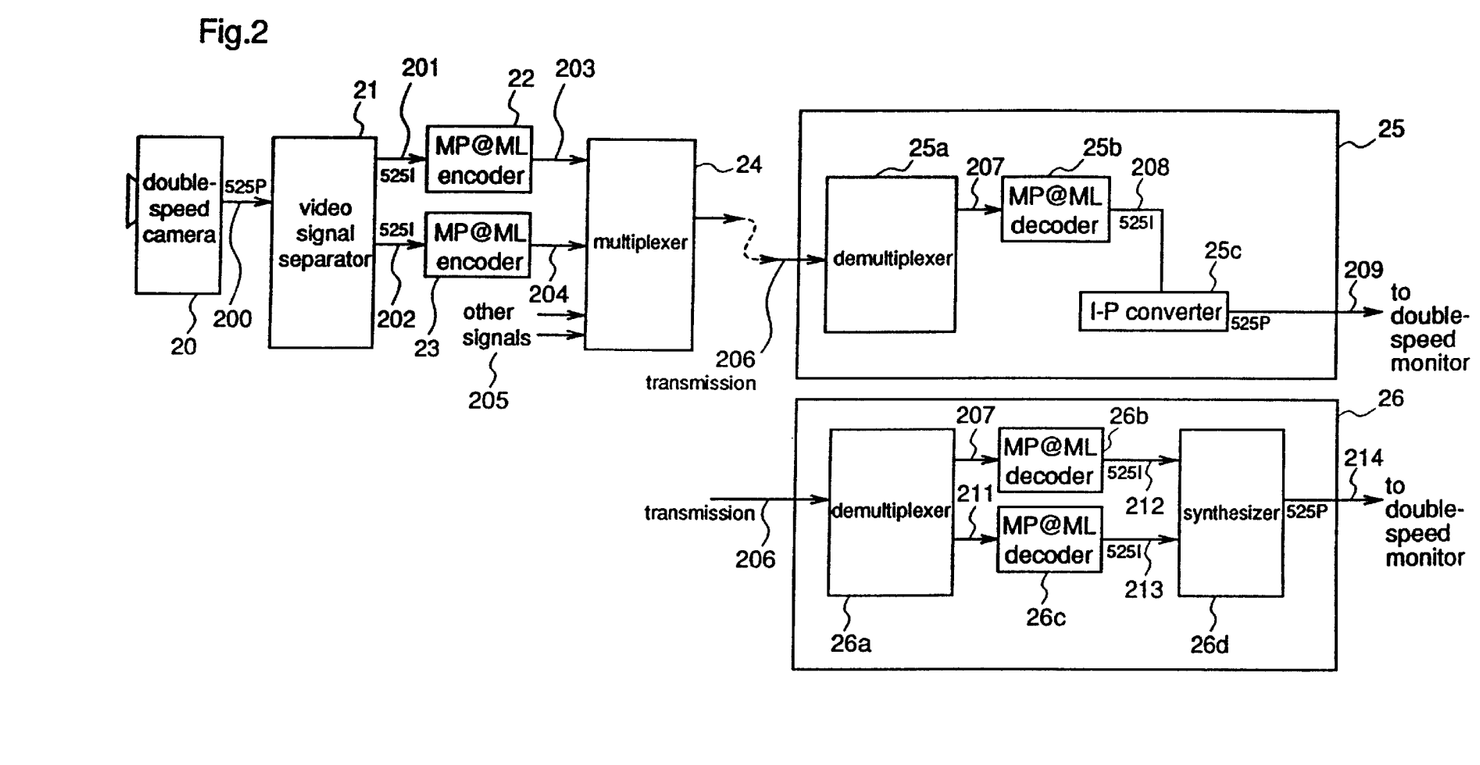
FIG. 2 is a block diagram illustrating a television signal transmitting and receiving apparatus according to a second embodiment of the present invention.

FIG. 2 is a block diagram illustrating a transmitter (encoder) and a receiver (decoder) in a television signal transmitting and receiving apparatus according to a second embodiment of the present invention. In this second embodiment, when a stream specified in MPEG2-System is coded, an image having a resolution according to the accounting level is prepared. In FIG. 2, reference numeral 20 designates a double-speed camera (525P), called a progressive camera, that can scan a target at a speed twice as high as that of an ordinary camera. Reference numeral 21 designates a video signal separator for separating a video signal 202 shot by the double-speed camera 20 into two interlace signals 201 and 202. Reference numerals 22 and 23 designate MP@ML encoders for coding the interlace signals 201 and 202 within the standard of MP@ML (Main Profile at Main Level), respectively. Reference numeral 24 designates a multiplexer for multiplexing coded signals 203 and 204, and other coded signals 205. Reference numeral 25 designates a receiver's side first decoder for low resolution. The first decoder 25 comprises a demultiplexer 25a, an MP@ML decoder 25b, and an I-P converter 25c. The demultiplexer 25a receives a stream 206 sent from the transmitter, converts the signal included in the stream 206 into signals in the states before the multiplexing, and outputs a coded signal 207 that corresponds to one of the coded signals 203 and 204 which are obtained in the transmitter by encoding the interlace signals 201 and 202 within the MP@ML standard. The MP@ML decoder 25b decodes the coded signal 207 output from the demultiplexer 25a and outputs a decoded interlace signal 208. The I-P converter 25c converts the decoded interlace signal 208 into a signal 209 for high-resolution and double-speed monitoring. Reference numeral 26 designates a receiver's second decoder for high resolution. The second decoder 26 comprises a demultiplexer 26a, MP@ML decoders 26b and 26c, and a synthesizer 26d. The demultiplexer 26a receives the stream 206 sent from the transmitter, converts the signal included in the stream 206 into signals in the states before the multiplexing, and outputs a coded signal 207 which corresponds to one of the coded signals 203 and 204, and a coded signal 211 which corresponds to the other. The MP@ML decoders 26b and 26c decode the coded signals 207 and 211 and outputs decoded interlace signals 212 and 213, respectively. The synthesizer 26d synthesizes the decoded interlace signals 212 and 213 and outputs a signal 214 for high-resolution and double-speed monitoring. In the receiver according to this second embodiment, one of the first decoder 25 and the second decoder 26 is selected to decode the stream 206 from the transmitter, in response to an external input signal (not shown) corresponding to the user input 110 described in the first embodiment.

A description is given of the operation of the television signal transmitting and receiving apparatus according to this second embodiment.

Figure 3:
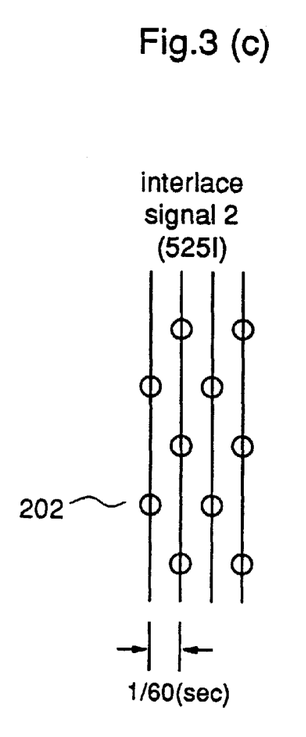
FIGS. 3(a)–3(d) are diagrams for explaining the video signal processing by the transmitter in the apparatus according to the second embodiment.

Since the video signal 200 shot by the double-speed camera 20 (refer to FIG. 3(a)) is not transmittable as it is in the NTSC band, it is separated into two interlace signals 203 (FIG. 3(b)) and 204 (FIG. 3(c)). These interlace signals 201 and 202 are coded by the MP@ML encoders 22 and 23, producing coded interlace signals 203 and 204, respectively. In the MP@ML standard, an image quality as high as that of an NTSC system broadcast is obtained. The multiplexer 24 receives the coded interlace signals 203 and 204 through different channels and also receives other coded signals 205, such as accounting information, and multiplexes these signals to produce a transmission signal 206.

Although constituents relating to accounting information, such as a system decoder and an accounting control unit as those described for the first embodiment, are not shown in FIG. 2, in this second embodiment, the operation of receiving the transmission signal by the receiver and separating the accounting information from the transmission signal is identical to the operation performed by the system decoder according to the first embodiment.

In the receiver, according to the accounting level, the transmission signal (video stream) 206 is decoded by one of the first decoder 25 for low resolution and the second decoder 26 for high resolution. More specifically, when the accounting level is low, the transmitted stream 206 is input to the first decoder 25. In the first decoder 25, the demultiplexer 25a converts the signal included in the stream 206 into signals in the states before the multiplexing, and outputs a coded signal 207 that corresponds to one of the coded signals 203 and 204 which are respectively produced in the transmitter by coding the interlace signals 201 and 202 within the MP@ML standard. The coded signal 207 is input to the MP@ML decoder 25b and decoded to an interlace signal 208. In this case, the other coded signal, i.e., one of the coded signals 203 and 204, is not decoded. Since the decoded interlace signal 208 cannot be displayed as it is by the double-speed monitor, it is subjected to, for example, interpolation, by the I-P converter 25c and then it is output as a non-interlace monitor signal 209.

On the other hand, when the accounting level is high, the transmitted stream 206 is input to the second decoder 26. In the second decoder 26, the demultiplexer 26a converts the signal included in the stream 206 into signals in the states before the multiplexing, and outputs coded signals 207 and 211 that respectively correspond to the coded signals 203 and 204 which are produced in the transmitter by coding the interlace signals 201 and 202 within the MP@ML standard. These coded signals 207 and 211 are input to the MP@ML decoders 26b and 26c and decoded to interlace signals 212 and 213, respectively. These interlace signals 212 and 213 are input to the synthesizer 26d and synthesized to be a signal equal to the video signal 200 shot by the double-speed camera 20 before separation by the video signal separator 21. This video signal is output from the synthesizer 26d as a monitor signal 214.

As described above, according to the second embodiment of the invention, the video signal 200 shot by the double-speed camera 20 is converted into two interlace signals 201 and 202, and these interlace signals are coded by the MP@ML encoders 22 and 23, received by the multiplexer 24 through different channels and multiplexed, and transmitted to the decoder (receiver). In the decoder, it is decided according to the accounting level whether both the interlace signals 201 and 202 are decoded or one of the interlace signals is decoded. Therefore, an apparatus and a method for transmitting and receiving television signals, which can offer a service with a resolution according to the accounting level (two grades), are realized. Although two channels are completely occupied in the signal transmission, since a resolution as high as that of an HD television is obtained by the signal transmission in the NTSC band, the apparatus and the method according to this second embodiment are applicable to Wide and Clear Vision, i.e., EDTV-II. EDTV-II has been disclosed in the following publications: Japanese Patent Unexamined Publications Nos. Hei.1-258581, Hei.1-317079, Hei.3-237894, Hei.4-240982, and Hei.7-79420, and Japanese Patent Examined Publications Nos. Sho. 64-7555 and Hei.3-52278.

Further, since an image quality as high as that of an HD television is obtained with two MP@ML decoders utilizing MPEG2, the production cost is reduced as compared with a case where a decoder is fabricated using a memory, such as a DRAM.

[Embodiment 3]

Figure 4:
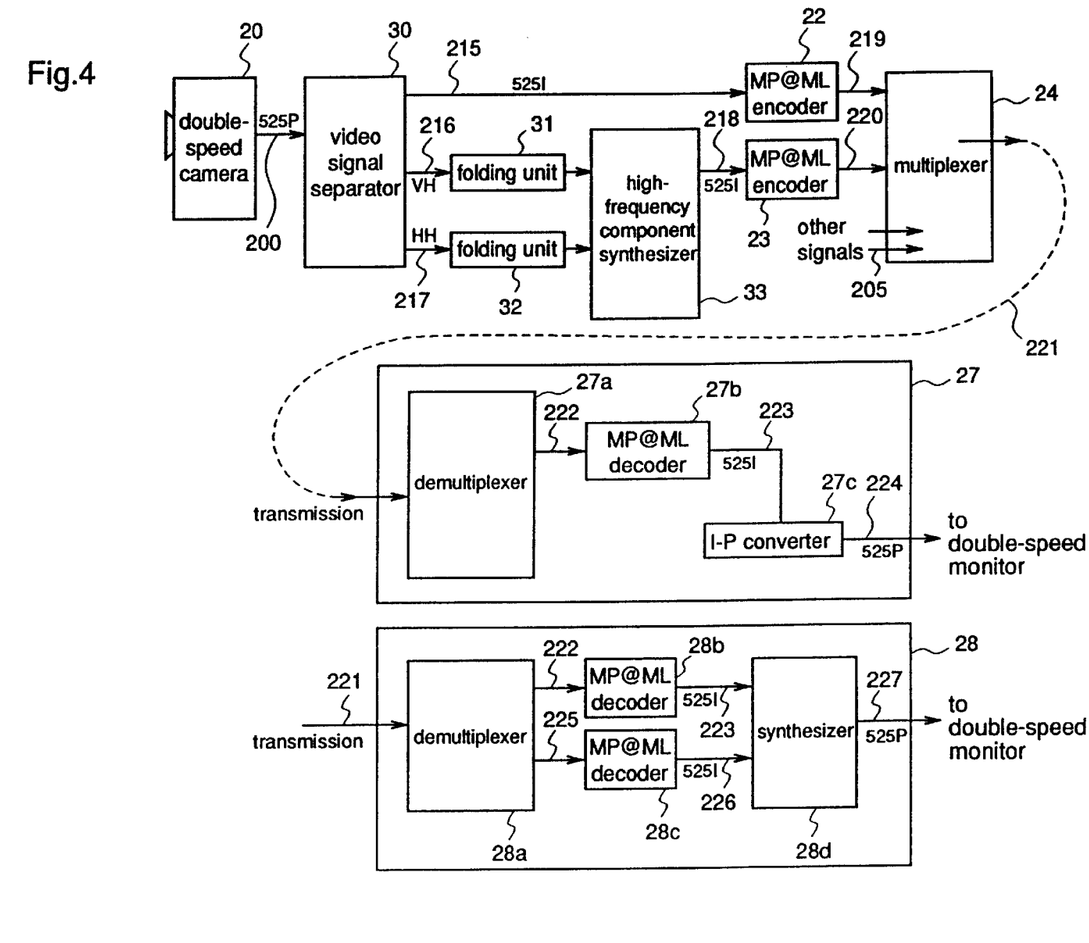
FIG. 4 is a block diagram illustrating a television signal transmitting and receiving apparatus according to a third embodiment of the present invention.

FIG. 4 is a block diagram illustrating a transmitter (encoder) and a receiver (decoder) in a television signal transmitting and receiving apparatus according to a third embodiment of the invention. This third embodiment provides another method for preparing an image of a resolution according to the accounting level when a stream specified in MPEG2-System is coded. In FIG. 4, reference numeral 30 designates a video signal separator for separating a video signal shot by a double-speed camera 20 into an interlace signal 215 of a main picture (Letter Box) in a frequency band that is transmittable by the NTSC system (hereinafter referred to as a main picture signal), and a vertical high-frequency (VH) component 216 and a horizontal high-frequency (HH) component 217 which are not transmittable by the NTSC system. Reference numerals 31 and 32 designate high-frequency component folding units for converting the VH and HH components 216 and 217 into low-frequency components, for example, -DC level components, using folding method. Reference numeral 33 designates a high-frequency component synthesizer for synthesizing the VH and HH components and outputting the synthesized signal as an interlace signal 218 within a frequency band transmittable by the NTSC system. Reference numeral 22 designates an MP@ML encoder for coding the main picture signal 215 and outputting a coded signal 219, and reference numeral 23 designates an MP@ML encoder 23 for coding the VH/HH component (interlace) signal 218 and outputting a coded signal 220. Reference numeral 24 designates a multiplexer for multiplexing the coded signals 219 and 220 and outputting a stream 221. Reference numeral 27 designates a receiver's first decoder for low resolution. The first decoder 27 comprises a demultiplexer 27a, an MP@ML decoder 27b, and an I-P converter 27c. The demultiplexer 27a receives the stream 221 from the transmitter, converts the signal included in the stream 221 into signals in the states before the multiplexing, and outputs a signal 222 which corresponds to the coded signal 219 obtained in the transmitter by coding the main picture signal 215 within the MP@ML standard. The MP@ML decoder 27b decodes the main picture coded signal 222 output from the demultiplexer 27a and outputs a main picture interlace signal 223. The I-P converter 27c converts the main picture interlace signal 222 into a signal 224 for high-resolution and double-speed monitoring. Reference numeral 28 designates a receiver's second decoder for high resolution. The second decoder 28 comprises a demultiplexer 28a, MP@ML decoders 28b and 28c, and a synthesizer 28d. The demultiplexer 28a receives the stream 221 sent from the transmitter, converts the signal included in the stream 221 into signals in the states before the multiplexing, and outputs a signal 222 which corresponds to the coded signal 219 obtained in the transmitter by coding the main picture signal 215 within the MP@ML standard, and a signal 225 which corresponds to the coded signal 220 obtained in the transmitter by coding the synthesized VH and HH components, i.e., the interlace signal 218, within the MP@ML standard. The MP@ML decoder 28b decodes the main picture coded signal 222 output from the demultiplexer 28a and outputs a main picture interlace signal 223. The MP@ML decoder 28c decodes the VH/HH component coded signal 225 output from the demultiplexer 28a and outputs a VH/HH component interlace signal 226. The synthesizer 28d synthesizes the decoded main picture interlace signals 223 and the decoded VH/HH component interlace signal 226, and outputs a signal 227 for high-resolution and double-speed monitoring. In the receiver employed for this third embodiment, one of the first decoder 27 and the second decoder 28 is selected as a decoder to decode the transmitted stream 221, in response to an external input signal (not shown) corresponding to the user input 110 described for the first embodiment.

The operation of the television signal transmitting and receiving apparatus according to the third embodiment of the invention will be described using FIG. 4.

The video signal 200 shot by the double-speed camera 20 is input to the video signal separator 30. The video signal separator 30 separates the video signal 200 into an interlace signal 215 of a main picture (Letter Box) in a frequency band that is transmittable by the NTSC system, and a vertical high-frequency (VH) component 216 and a horizontal high-frequency (HH) component 217 which are not transmittable by the NTSC system. The VH and HH components 216 and 217 are input to the folding units 31 and 32, respectively, wherein these high-frequency components are converted to, for example, DC level components. Thereafter, these VH and HH components are input to the synthesizer 33. The synthesizer 33 synthesizes the VH component and the HH component and outputs a high-frequency component (interlace) signal 218. The interlace signal 218 and the main picture interlace signal 215 are coded by the MP@ML encoders 23 and 22, respectively, and input to the multiplexer 24. The VH/HH component signal 220, which is obtained by folding and encoding the VH and HH components, occupies a frequency band narrower than the frequency band of the interlace signal 219, which is obtained by encoding the main picture signal 215, because the narrow band of the VH/HH component signal 220 does not adversely affect the practical use of the apparatus. The multiplexer 24 receives the two coded interlace signals 219 and 220 through different channels and also receives other coded video signals 205 through different channels, and multiplexes these signals to produce a transmission signal 221.

Although constituents relating to accounting information, such as a system decoder and an accounting control unit as those described for the first embodiment, are not illustrated in FIG. 4, also in this third embodiment, the operation of receiving the transmission signal by the receiver and separating the accounting information from the transmission signal is identical to the operation performed by the system decoder 10 according to the first embodiment.

In the receiver, according to the accounting level, the transmission signal (stream) 221 is decoded by one of the first decoder 27 for low resolution and the second decoder 28 for high resolution. More specifically, when the accounting level is low, the transmitted stream 221 is input to the first decoder 27. In the first decoder 27, the demultiplexer 25a converts the stream 221 into signals in the states before the multiplexing, and outputs a coded signal 222 that corresponds to the coded signal 219 which is produced in the transmitter by coding the main picture signal 215 in the MP@ML standard. The coded signal 222 is input to the MP@ML decoder 27b and decoded to an interlace signal 223. In this case, only the main picture coded signal 219 (one channel) is decoded while the VH/HH component coded signal 220 is not decoded. Since the interlace signal 223 output from the MP@ML decoder 27b cannot be displayed as it is by the double-speed monitor, it is subjected to, for example, interpolation, by the I-P converter 27c and then it is output as a non-interlace monitor signal 224.

On the other hand, when the accounting level is high, the transmitted stream 221 is input to the second decoder 28. In the second decoder 28, the demultiplexer 28a converts the stream 221 into signals in the states before the multiplexing, and outputs a coded signal 222 that corresponds to the coded signal 219 which is produced in the transmitter by coding the main picture signal 215 in the MP@ML standard, and a coded signal 225 that corresponds to the coded signal 220 which is produced in the transmitter by coding the VH/HH component signal 218 in the MP@ML standard. These coded signals 222 and 225 are input to the MP@ML decoder 28b and the MP@ML decoder 28c and decoded to interlace signals 223 and 226, respectively. That is, the two coded signals 219 and 220 before the multiplexing are decoded to signals of two channels, i.e., the main picture interlace signal 223 and the VH/HH component interlace signal 226, respectively. These decoded two-channel interlace signals 223 and 226 are input to the synthesizer 28d and synthesized to be a signal equal to the video signal 200 shot by the double-speed camera 20 before separation by the video signal separator 30. This video signal is output from the synthesizer 28d as a monitor signal 227.

As described above, according to the third embodiment of the invention, the video signal 200 shot by the double-speed camera 20 is separated into the main picture signal 215 that is transmittable by NTSC and the VH/HH component signals 216 and 217 that are not transmittable by NTSC, and these signals are encoded, multiplexed, and transmitted, through different channels. On the decoder's side, it is decided according to the accounting level whether both the two channel coded signals are decoded or only the main picture coded signal is decoded. Therefore, an apparatus and a method for transmitting and receiving television signals, which can offer a service with a resolution according to the accounting level (two grades), are realized. Although two channels are completely occupied in the signal transmission, since a resolution as high as that of an HD television is obtained by the signal transmission in the NTSC band, the apparatus and the method according to this third embodiment are applicable to Wide Clear Vision (EDTV-II) and the like. Further, since an image quality as high as that of an HD television is obtained with two MP@ML decoders utilizing MPEG2, the production cost is reduced as compared with a case where a decoder is fabricated using a memory, such as a DRAM. Further, since the encoded VH/HH component signal 220 occupies less frequency band, judging from the total bit rate, the frequency band used in the apparatus according to this third embodiment is reduced as compared with the second embodiment. Hence, the apparatus according to this third embodiment is superior in multiple channelizing to the apparatus according to the second embodiment.

Although in the first to third embodiments of the invention only the image quality is varied according to the accounting level, it is possible to vary the tone quality of reproduced voice according to the accounting level by transmitting signals of different bit rates for voice.

Although in the second and third embodiments of the invention encoding and decoding are performed in the MP@ML standard, MP@HL or HP@HL standard, which is superior in quality or resolution to the MP@ML standard, may be employed with the same effects as described above.

Further, although in the first to-third embodiments of the invention only two channels are used for one program, it will be possible in future to use multiple (three or more) channels for one program. Then, hierarchization with more stages will be realized, and an accounting according to the hierarchization will be possible.

Furthermore, it is possible to provide, according to the accounting level, additional information that is hierarchized in an MPEG2-Video stream or a prescribed channel, for example, information of goods relating to the program and offered by the sponsor. An interactive communication system can be constituted using the stream or the channel including the hierarchized additional information. For example, Japanese Patent Unexamined Publication No. Hei.7-123375 discloses an interactive communication system.

What is claimed is:

1. A television signal transmitting method for transmitting a digitally coded television signal, said method including transmitting accounting information and a single stream digitally coded television signal comprising one of a video signal having a resolution and an audio signal having a tone quality, which resolution and tone quality correspond to a decoding coefficient input to a receiver by a user, said decoding coefficient varying the quality of said digitally coded television signal in accordance with an accounting level input by a user, said accounting level being stored in a receiver and a total accounting amount being transmitted to an accounting center.

2. A television signal transmitting apparatus for transmitting a digitally coded television signal, comprising: an encoding means for transmitting, as a single stream digitally coded television signal, one of a video signal having a resolution and an audio signal having a tone quality, which resolution and tone quality correspond to a decoding coefficient input to a receiver by a user, said coefficient varying the quality of said digitally coded television signal in accordance with an accounting level.

3. A television signal receiving method for receiving a single stream digitally coded television signal, comprising:

variably controlling a decoding coefficient in response to an external input, said decoding coefficient varying the quality of said digitally coded television signal in accordance with an accounting level input by a user;

converting the digitally coded television signal into one of a video signal having a resolution according to the controlled decoding coefficient and an audio signal having a tone quality according to the controlled decoding coefficient;

storing the accounting level input by the user for each digitally coded television signal; and transmitting a total accounting amount to a central accounting center.

4. The television signal receiving method of claim 3 further comprising:

storing a variation in the decoding coefficient value, as information, with a lapse of time; and posting the information, for a prescribed period of time, to a base station that transmits the television signal.

5. A television signal receiving apparatus for receiving a single stream digitally coded television signal, comprising:

a decoding coefficient control means including an accounting control unit for variably controlling a decoding coefficient in response to a user input, said decoding coefficient varying the quality of said digitally coded television signal in accordance with an accounting level input by the user;

a signal reproducing means for converting the digitally coded television signal into one of a video signal having a resolution according to the controlled decoding coefficient and an audio signal having a tone quality according to the controlled decoding coefficient;

an IC card for storing the accounting level input by the user for each digitally coded television signal; and a modem for transmitting a total accounting amount to a central accounting center.

6. The television signal receiving apparatus of claim 5 further comprising:

means for storing a variation in the decoding coefficient value, as information, with a lapse of time, and posting the information, for a prescribed period of time, to a base station that transmits the television signal.

7. The television signal transmitting method of claim 1 further comprising:

separating a video signal into N video signals (N=integer); and coding the N video signals individually to create coded video signals and transmitting the coded video signals through different channels.

8. The television signal receiving method of claim 3 wherein said digitally coded television signal comprises a plurality of coded video signals, said method further comprising:

reproducing either the entire plurality of coded video signals or less than the entire plurality of coded video signals, in accordance with an external input.

9. The television signal transmitting apparatus of claim 2 further comprising:

a video signal separating means for separating a video signal into N video signals (N=integer); and a video signal encoding means for coding the N video signals individually to create coded video signals and transmitting the coded video signals through different channels.

10. The television signal receiving apparatus of claim 5 further comprising:

a video signal decoding means for reproducing a plurality of coded video signals in accordance with an external input.

11. The television signal transmitting method of claim 1 further comprising:

separating a video signal having a resolution twice as high as an ordinary resolution into two video signals each having an ordinary resolution; and coding the two video signals individually to create coded video signals, and transmitting the coded video signals through different channels.

12. The television signal receiving method of claim 3 further comprising:

reproducing two coded video signals, each having an ordinary resolution, or reproducing only one of the coded video signals, in accordance with an external input.

13. The television signal transmitting apparatus of claim 2 further comprising:

a video signal separating means for separating a video signal having a resolution twice as high as an ordinary resolution into two video signals each having an ordinary resolution; and a video signal encoding means for coding the two video signals individually, and transmitting the coded video signals through different channels.

14. The television signal receiving apparatus of claim 5 further comprising:

a video signal decoding means for reproducing two coded video signals, each having an ordinary resolution, and for reproducing only one of the coded video signals, in accordance with an external input.

15. The television signal transmitting method of claim 1 further comprising:

separating a video signal having a resolution twice as high as an ordinary resolution into a first video signal comprising high-frequency components and a second video signal comprising components other than the high-frequency components; and coding the first video signal and the second video signal individually, and transmitting the coded first and second video signals through different channels.

16. The television signal receiving method of claim 3 further comprising:

reproducing either both a first video signal comprising high-frequency components and a second video signal comprising components other than the high-frequency components, which video signals are obtained by separating a video signal having a resolution twice as high as an ordinary resolution, or reproducing either the first or second video signals, in accordance with an external input.

17. The television signal transmitting apparatus of claim 2 further comprising:

a video signal separating means for separating a video signal having a resolution twice as high as an ordinary resolution into a first video signal comprising high-frequency components and a second video signal comprising components other than the high-frequency components; and a video signal encoding means for encoding the first video signal and the second video signal individually, and transmitting the coded first and second video signals through different channels.

18. The television signal receiving apparatus of claim 5 further comprising:

a video signal decoding means for reproducing both a first video signal comprising high-frequency components and a second video signal comprising components other than the high-frequency components, which video signals are obtained by separating a video signal having a resolution twice as high as an ordinary resolution, or reproducing either the first or second video signals, in accordance with an external input.

19. The television signal transmitting method of claim 1 for transmitting a digitally coded television signal, further comprising:

separating an audio signal into N audio signals (N=integer); and coding the N audio signals individually and transmitting the coded audio signals through different channels.

20. The television signal receiving method of claim 3 further comprising:

reproducing either all coded N audio signals (N=integer) or some of the N audio signals transmitted in a digitally coded television signal, in accordance with an external input.

21. The television signal transmitting apparatus of claim 2 further comprising:

an audio signal separating means for separating an audio signal into N audio signals (N=integer); and an audio signal encoding means for coding the N audio signals individually and transmitting the coded audio signals through different channels.

22. A television signal receiving apparatus of claim 5 further comprising:

an audio signal decoding means for reproducing all coded N audio signals (N=integer) or some of the N audio signals transmitted in a digitally coded television signal, in accordance with an external input.

23. The television signal transmitting method of claim 1 further comprising:

separating an audio signal having a tone quality higher than an ordinary tone quality into two audio signals each having the ordinary tone quality; and coding the two audio signals individually, and transmitting the coded audio signals through different channels.

24. The television signal receiving method of claim 3 wherein two coded audio signals, each having an ordinary tone quality, are reproduced or only one of the coded audio signals is reproduced, in accordance with an external input.

25. A television signal transmitting apparatus of claim 2 further comprising:

an audio signal separating means for separating an audio signal having a tone quality higher than an ordinary tone quality into two audio signals each having the ordinary tone quality; and an audio signal encoding means for coding the two audio signals individually, and transmitting the coded audio signals through different channels.

26. The television signal receiving apparatus of claim 5 further comprising:

an audio signal decoding means for reproducing both of two coded audio signals, each having an ordinary tone quality, or reproducing only one of the coded audio signals, in accordance with an external input.

27. The television signal transmitting method of claim 1 further comprising:

separating an audio signal having a tone quality higher than an ordinary tone quality into a first audio signal having a relatively high bit rate and a second audio signal having a relatively low bit rate; and coding the first audio signal and the second audio signal individually, and transmitting the coded first and second audio signals through different channels.

28. A television signal receiving method of claim 3 wherein both a first audio signal having a relatively high bit rate and a second audio signal having a relatively low bit rate, which audio signals are obtained by separating an audio signal having a tone quality higher than an ordinary tone quality, are reproduced or only one of the first and second audio signals is reproduced, in accordance with an external input.

29. A television signal transmitting apparatus of claim 2 further comprising:

an audio signal separating means for separating an audio signal having a tone quality higher than an ordinary tone quality into a first audio signal having a relatively high bit rate and a second audio signal having a relatively low bit rate; and an audio signal encoding means for encoding the first audio signal and the second audio signal individually, and transmitting the coded first and second audio signals through different channels.

30. A television signal receiving apparatus of claim 5 further comprising:

an audio signal decoding means for reproducing both a first audio signal having a relatively high bit rate and a second audio signal having a relatively low bit rate, which audio signals are obtained by separating an audio signal having a tone quality higher than an ordinary tone quality, or reproducing one of the first and sound audio signals is reproduced, in accordance with an external input.

* * * * *